(12) United States Patent
Zabaleta Maeztu et al.

(10) Patent No.: US 9,660,553 B2
(45) Date of Patent: May 23, 2017

(54) SWITCHING STAGE, ENERGY CONVERSION CIRCUIT, AND CONVERSION STAGE FOR WIND TURBINES COMPRISING THE ENERGY CONVERSION CIRCUIT

(71) Applicant: INGETEAM POWER TECHNOLOGY, S.A., Zamudio, Viscaya (ES)

(72) Inventors: Mikel Zabaleta Maeztu, Sarriguren (ES); Jesus Lopez Taberna, Pamplona (ES); Eduardo Burguete Archel, Pamplona (ES)

(73) Assignee: INGETEAM POWER TECHNOLOGY, S.A., Zamudio (ES)

( * ) Notice: Subject to any disclaimer, the term of this patent is extended or adjusted under 35 U.S.C. 154(b) by 39 days.

(21) Appl. No.: 14/648,357

(22) PCT Filed: Nov. 30, 2012

(86) PCT No.: PCT/ES2012/070843
§ 371 (c)(1),
(2) Date: May 29, 2015

(87) PCT Pub. No.: WO2014/083214
PCT Pub. Date: Jun. 5, 2014

(65) Prior Publication Data
US 2015/0295515 A1    Oct. 15, 2015

(51) Int. Cl.
*H02M 3/07* (2006.01)
*H02M 7/72* (2006.01)
(Continued)

(52) U.S. Cl.
CPC ............. *H02M 7/72* (2013.01); *H02M 7/483* (2013.01); *H02M 7/49* (2013.01); *H02M 7/487* (2013.01); *Y02E 10/76* (2013.01)

(58) Field of Classification Search
CPC ................. H02M 5/293; H02M 7/483; H02M 2007/4835
(Continued)

(56) References Cited

U.S. PATENT DOCUMENTS 5,461,557 A * 10/1995 Tamagawa ............... H02M 3/07
307/110
5,680,300 A * 10/1997 Szepesi .................... H02M 3/07
363/59
(Continued)

FOREIGN PATENT DOCUMENTS

EP    0555432 A1    8/1993
EP    1287609 A2    3/2003
(Continued)

OTHER PUBLICATIONS

Peng, "A Generalized Multilevel Inverter Topology with Self Voltage Balancing", IEEE Transactions on Industry Applications, Mar./Apr. 2001, vol. 37, No. 2, pp. 611-618.
(Continued)

*Primary Examiner* — Rajnikant Patel
(74) *Attorney, Agent, or Firm* — Sughrue Mion, PLLC

(57) ABSTRACT

The present invention relates to an energy conversion circuit comprising a switching stage with a positive DC voltage terminal (1), a negative DC voltage terminal (3), m−1 intermediate DC voltage terminals (2) m DC bus capacitors (5); and p linked cells consisting of m+1 switches (9) and at least one capacitor (10), connecting cell 1 to the positive DC voltage terminal (1), negative DC voltage terminals (3) and intermediate DC voltage terminals (2); and a multilevel converter, the output of which is connected to the AC voltage terminal (4), with a positive voltage terminal (12) and a negative voltage terminal (14) of the multilevel converter and m−1 intermediate voltage terminals of the multilevel converter (13), which are connected to the posi-
(Continued)

tive output terminal of the switching stage (6), to the negative output terminal of the switching stage (8), and to the m−1 intermediate output terminals of the switching stage (7), respectively.

14 Claims, 15 Drawing Sheets

(51) Int. Cl.
*H02M 7/483* (2007.01)
*H02M 7/49* (2007.01)
*H02M 7/487* (2007.01)

(58) Field of Classification Search
USPC .... 323/267, 271, 272, 282, 288; 363/59, 60, 363/62, 65, 127, 131, 132
See application file for complete search history.

(56) References Cited

U.S. PATENT DOCUMENTS

| | | | | | |
|---|---|---|---|---|---|
| 6,111,770 | A * | 8/2000 | Peng | ............... | H02M 7/4826 363/131 |
| 6,337,804 | B1 * | 1/2002 | Kea | ............... | H02M 7/487 363/132 |
| 6,798,677 | B2 * | 9/2004 | Jakob | ............... | H02M 7/003 363/123 |
| 6,958,924 | B2 * | 10/2005 | Gateau | ............... | H02M 7/483 363/132 |
| 8,441,820 | B2 * | 5/2013 | Shen | ............... | H02M 7/487 363/131 |
| 2011/0031956 | A1 * | 2/2011 | Athas | ............... | H02M 3/07 323/364 |

FOREIGN PATENT DOCUMENTS

| | | |
|---|---|---|
| EP | 1673849 A1 | 6/2006 |
| EP | 1815586 A1 | 8/2007 |
| EP | 1051799 B1 | 7/2008 |
| WO | 93/02501 A1 | 2/1993 |
| WO | 01/93412 A2 | 12/2001 |
| WO | 2005036719 A1 | 4/2005 |
| WO | 2006/053448 A1 | 5/2006 |

OTHER PUBLICATIONS

International Search Report and the Written Opinion dated Aug. 23, 2013, issued by the International Searching Authority in corresponding International Application No. PCT/ES2012/070843.

Meynard et al., "Multicell Converters: Derived Topologies", IEEE Transactions on Industrial Electronics, Oct. 2002, vol. 49, No. 5, pp. 978-987.

Marchesoni et al., "An Optimal Controller for Voltage Balance and Power Losses Reduction in MPC AC/DC/AC Converters", IEEE 31st Annual Power Electronics Specialists Conference, 2000, vol. 2, pp. 662-667.

Celanovic et al., "A Comprehensive Study of Neutral-Point Voltage Balancing Problem in Three-Level Neutral-Point-Clamped Voltage Source PWM Inverters", IEEE Transactions on Power Electronics, Mar. 2000, vol. 15, No. 2, pp. 242-249.

* cited by examiner

US 9,660,553 B2

SWITCHING STAGE, ENERGY CONVERSION CIRCUIT, AND CONVERSION STAGE FOR WIND TURBINES COMPRISING THE ENERGY CONVERSION CIRCUIT

CROSS REFERENCE TO RELATED APPLICATIONS

This application is a National Stage of International Application No. PCT/ES2012/070843 filed Nov. 30, 2012, the contents of all of which are incorporated herein by reference in their entirety.

OBJECT OF THE INVENTION

The present invention is encompassed in the technical field of electronic power converters. More specifically, the present invention relates to a multilevel energy conversion circuit, especially for being applied in converting energy from a wind generator (or wind turbine) and to the switching stage of said conversion circuit, with a plurality of output voltage levels and large current capacity.

BACKGROUND OF THE INVENTION

Electronic converters are widely used in energy generation applications, such as in wind generators for example. Desired requirements of a converter include obtaining an output current with the best Total Harmonic Distortion (THD) level possible and obtaining a high voltage to minimize conduction losses.

Today, most manufacturers of electronic conversion stages are trying to increase their power by increasing the number of voltage levels in the output voltage. Not only does this increase the handled power but it also increases the quality of the delivered current by largely reducing the harmonic content.

The two preceding objectives can be achieved by means of using multilevel converters. These converters are capable of working with different voltage levels, to try to obtain an output current with the best THD possible, i.e., with the best wave quality possible. They are also capable of increasing the working voltage, which is a desirable characteristic for obtaining fewer losses.

A number of multilevel conversion topologies are known in the state of the art, such as that described in EP0555432A1, EP1051799B1, EP1673849A1, EP1815586A1, EP1287609A2 and in "Generalized Multilevel Inverter Topology with Self Voltage Balancing" by F. Z. Peng, IEEE Transactions on Industry Applications, Vol. 37, pp. 611-618, March/April 2001. Nevertheless, most of these topologies involve an excessively complicated and expensive electromechanical design.

For example, the converter described in "Generalized Multilevel Inverter Topology with Self Voltage Balancing" provides the previously specified characteristics for a multilevel converter, but it requires a large number of semiconductors and capacitors, which considerably increases converter size and cost.

Another multilevel converter providing the aforementioned characteristics is that described in EP0555432A1, which consists of n cells, made up of one capacitor and two semiconductors, series-connected one after the other. The increase in the available voltage levels is done by means of adding or taking away the capacitor voltages. However, this converter has the drawback of being large-sized and expensive due to the capacitors, which largely complicates the electromechanical design. The need for this large size limits the number of levels that can be reached by this converter because there comes a time when the required volume makes it no longer viable.

EP1287609A2 proposes a converter that allows reducing capacitor volume. Like in the converter disclosed in EP0555432A1 described above, the converter proposed in EP1287609A2 consists of cells series-connected, but in this case, each cell consists of two capacitors and three pairs of semiconductors. This enables achieving three voltage levels with each cell and, in the case of series-connecting n cells, 2*n+1 levels in total. The problem with cells of this type is that two pairs of semiconductors are arranged in series, which complicates control over distributing voltage among them.

EP1051799B1 proposes a multilevel converter called Active Neutral Point Clamped (ANPC) converter, consisting of a Neutral Point Clamped (NPC) type converter in which the level or clamp diodes are replaced with controlled semiconductors. On the other hand, if more than three output voltage levels are desired, it proposes intercalating capacitors in the output stage. The main problem with the converter described in EP1051799B1 is that to obtain a converter of n levels it is necessary to series-connect (n−1)/2 controlled semiconductors, complicating the distribution of voltages among said semiconductors.

EP1673849A1 attempts to solve this problem, disclosing a multilevel converter formed by series-connecting several switching units, each of which is made up of two controlled semiconductors arranged in series through a capacitor.

A problem shared by all the mentioned converters is the overvoltages occurring in the semiconductors in switching. These overvoltages are caused by stray inductances and in practice they reduce the current capacity and the service life of the semiconductors. The circuit described in EP1815586A1, using additional voltage limiting circuits and semiconductors, tries to mitigate this phenomenon, but these additional elements increase cost and size and make the converter more complex.

Therefore the technical problem is to be able to convert energy by obtaining an output voltage and current which minimize conduction losses without increasing the size, complexity or cost of the converter.

DESCRIPTION OF THE INVENTION

The present invention serves to solve the aforementioned problem by means of a switching stage that can be integrated in an energy conversion circuit which reduces the number and/or size of the required capacitors, fixes the voltage of the switches, reduces the overvoltages experienced by switches in switching, providing a multilevel energy converter, with n output voltage levels, both for direct current to alternating current (DC/AC) conversion and alternating current to direct current (AC/DC) conversion, having considerable advantages with respect to the converters of the prior state of the art because of its smaller size and lower cost, greater design simplicity, greater operating and control simplicity, and improved attainable power levels.

The present invention can be applied in wind generator systems, among other energy conversion systems.

One aspect of the invention relates to a switching stage with n output voltage levels, which can be integrated in an energy conversion circuit, consisting of a bus with a plurality of m capacitors, interconnected between a positive bus voltage terminal and a negative bus voltage terminal, having m−1 intermediate bus voltage terminals between the previous two positive and negative bus voltage terminals. This switching stage comprises multiple linked cells, each consisting of m+1 input terminals, m+1 output terminals and at least one capacitor connected to any two of the m+1 output terminals, and m+1 switches, each switch i (i=1, 2, ..., m, m+1) being connected between the input terminal i and the output terminal i of the cell. The connection between the p (p>=1) cells of the switching stage is as follows:

connecting, for j=1 to j=p−1, cell j to cell j+1 such that:
for i=1 to i=m+1, output terminal i of cell j is connected to input terminal i of cell j+1;
connecting cell 1 to m DC bus capacitors as follows:
for i=1 to i=m+1, input terminal i of cell 1 is connected to bus voltage terminal i.

The proposed switching stage has a total of m+1 output terminals, consisting of the positive output terminal of the switching stage, m−1 intermediate output terminals and the negative output terminal of the switching stage, and having output terminal i of the switching stage connected to output terminal i of cell p, for i=1 (corresponding to the positive output terminal) to i=m+1 (corresponding to the negative output terminal of the switching stage).

In a preferred embodiment, the number of intermediate terminals is equal to 1, i.e., the number of bus capacitors is equal to 2. Two possible embodiments of the switching stage can be distinguished from this configuration. In a possible embodiment of the invention, a capacitor is connected between the positive output terminal and intermediate output terminal, and between the intermediate output terminal and negative output terminal in all the cells of the switching stage. This embodiment allows reducing the overvoltages experienced by all the switches during switching and fixing the voltage of all the semiconductors. In another possible embodiment, a capacitor is connected between the positive output terminal and intermediate output terminal, and between the intermediate output terminal and negative output terminal in some of the cells of the switching stage, while only one capacitor is connected between the positive output terminal and negative output terminal of other cells. This last preferred embodiment allows reducing the overvoltage experienced by many of the switches during switching, fixing the voltage of the switches and distributing the losses of some of the switches.

The bus can also preferably consist of 3 or 4 capacitors, i.e., the number of intermediate voltage terminals of the cells is 2 or 3, respectively. In both cases, preferably all the cells of the switching stage connect to each capacitor between every two adjacent terminals of all the cells, such that the voltage of the switches is fixed and the overvoltages experienced by the switches during switching are reduced compared with other converters.

According to a possible embodiment of the invention, optionally some of the capacitors of the switching stage can have a series-connected resistor to limit voltage and current oscillations during switching.

The capacitors of the cells of the switching stage, proposed as a switching stage which can be part of an energy converter, solve the problem of the overvoltages experienced in the semiconductors of some converters of the state of the art, such as those described in the previously cited documents EP1287609A2, EP1051799B1, EP1673849A1 and EP1815586A1, because said capacitors of the cells provide paths for the current with lower inductance than in the mentioned converters.

The switches of the switching stage can be IGBTs (Isolated Gate Bipolar Transistor), IGCTs (Integrated Gate Controlled Thyristor), IEGTs (Injection Enhanced Gate Transistor), GTO (Gate Turn-Off) thyristors and any combination thereof, anti-parallel connecting a diode for any of them, thereby obtaining two-way semiconductors with respect to current and one-way semiconductors with respect to voltage.

The switches of the switching stage can be controlled by means of a pulse width modulation (PWM) strategy which allows synthesizing an alternating voltage in the AC terminal.

Another aspect of the invention relates to a DC/AC or AC/DC energy conversion circuit for n output voltage levels, comprising the switching stage described above (with its plurality of cells, each cell consisting of m+1 switches and at least one capacitor, the m+1 output terminals of each cell, including one positive voltage terminal, another negative voltage terminal and m−1 intermediate voltage terminals in each linked cell), and further comprising a multilevel converter with m+1 voltage terminals, including one positive voltage terminal, another negative voltage terminal and m−1 intermediate voltage terminals, which are connected respectively to the output terminals of the switching stage.

When comparing the conversion circuit of the invention with those already existing and discussed in the state of the art, such as the converter described in the previously cited document "Generalized Multilevel Inverter Topology with Self Voltage Balancing" by F. Z. Peng, the conversion circuit herein proposed requires a smaller number of semiconductors and the capacitors are smaller in size. The proposed circuit also has this advantage of requiring a smaller size for the capacitors compared with the converter described in EP0555432A1. The present circuit further has the advantage of assuring semiconductor voltage distribution compared with the converters described in EP1287609A2 and EP1051799B1.

The energy conversion circuit of the present invention has redundant switching states, i.e., the same output voltage level is obtained with different semiconductor switching states. However, these redundant switching states have a contrary effect on capacitor voltage. To that end, the capacitor voltage can be controlled by using redundant switching states.

The energy conversion circuit according to the present invention can preferably be integrated in a three-phase system, where at least one conversion circuit according to the invention can be connected for each phase. Another possible implementation option is for the energy conversion circuit to be integrated in a configuration where at least two three-phase converters share the same DC bus (Back-To-Back configuration), connecting an energy conversion circuit according to the invention on the power grid side and another energy conversion circuit according to the invention on the energy generator side.

To keep the voltage of the intermediate DC voltage terminals in the three-phase system to which a conversion circuit according to the invention is connected in each electric phase stable, additional voltage control and/or modulation control hardware is required. For example, for the case of a bus with two capacitors in the switching stage of the conversion circuit, the voltage of the intermediate DC voltage terminal can be controlled by means of the homopolar voltage, i.e., by using different phase voltages providing equal line voltages and having a different effect on the voltage of the intermediate DC voltage terminal, as shown in "A Comprehensive Study of Neutral-Point Voltage Balancing Problem in Three-Level Neutral-Point-Clamped Voltage Source PWM Inverters" by N. Celanovic, IEEE Transactions on Power Electronics, Vol. 15, pp. 242-249, March 2000. For the case of 2 or 3 intermediate DC voltage terminals, a Back-To-Back configuration (two three-phase converters share the same DC bus) is preferred because in this configuration, there are techniques for controlling the voltage of said terminals, such as that shown in "An Optimal Controller for Voltage Balance and Power Losses Reduction in MPC AC/DC/AC Converters" by M. Marchesoni, IEEE 31st Annual Power Electronics Specialists Conference, Vol. 2, pp., 662-667, 2000.

The energy conversion circuit can particularly be applied in wind generator systems and can be integrated in wind turbine conversion stages, so another aspect of the present invention is an energy conversion stage for wind turbines comprising a circuit such as that described above.

DESCRIPTION OF THE DRAWINGS

To complement the description that is being made and for the purpose of aiding to better understand the features of the invention according to a preferred practical embodiment thereof, a set of drawings is attached as an integral part of said description wherein the following has been depicted with an illustrative and non-limiting character.

PREFERRED EMBODIMENT OF THE INVENTION

Figure 1:
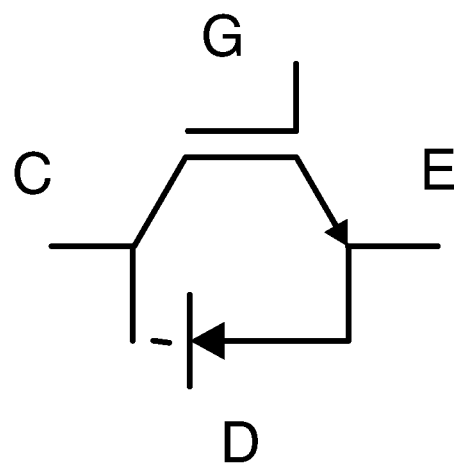
FIG. 1 shows a schematic depiction of a controlled semiconductor example of the semiconductor type used in the present invention.

The invention is described below in reference to the different figures which depict, in the case of FIGS. 2A, 2B, 2C 2D and 7, several implementation examples of a switching stage according to the present invention which can be applied in a multilevel conversion circuit, whereas FIGS. 3A, 3B, 3C, 4A, 4B, 4C, 5 and 6A-6B illustrate different embodiments of the multilevel conversion circuit with a switching stage according to the invention. In the embodiments herein illustrated, controlled semiconductors, for example, an IGBT, i.e., an Insulated Gate Bipolar Transistor, such as those shown in FIG. 1, are used as switches. In any case, the drawings and examples do not intend to limit the invention to any specific embodiments.

Reference numbers identifying the following elements are shown in the drawings:
(1) positive DC voltage terminal
(2) intermediate DC voltage terminal
(3) negative DC voltage terminal
(4) AC voltage terminal
(5) DC bus capacitor
(6) positive output terminal of the switching stage
(7) intermediate output terminal of the switching stage
(8) negative output terminal of the switching stage
(9) switch
(10) capacitor
(11) resistor
(12) positive voltage terminal of the multilevel converter
(13) intermediate voltage terminal of the multilevel converter
(14) negative voltage terminal of the multilevel converter
(C) collector
(E) emitter
(P) gate
(D) diode FIG. 1 shows a conventional controlled IGBT semiconductor, comprising a collector (C), a gate (P), an emitter (E) and a diode (D), which can perform the function of a switch (9) in the different embodiments of the multilevel energy conversion circuit proposed below. The switches (9) can be two-way with respect to current and one-way with respect to voltage.

FIGS. 2A, 2B, 2C and 2D show various implementation examples of a multilevel switching stage according to the invention, comprising a plurality of controlled IGBT semiconductors acting as switches (9) and a bus of capacitors, for the cases of a configuration with 2, 3 or 4 DC bus capacitors (5), i.e., for 1, 2 or 3 intermediate DC voltage terminals (2).

Figure 2A:
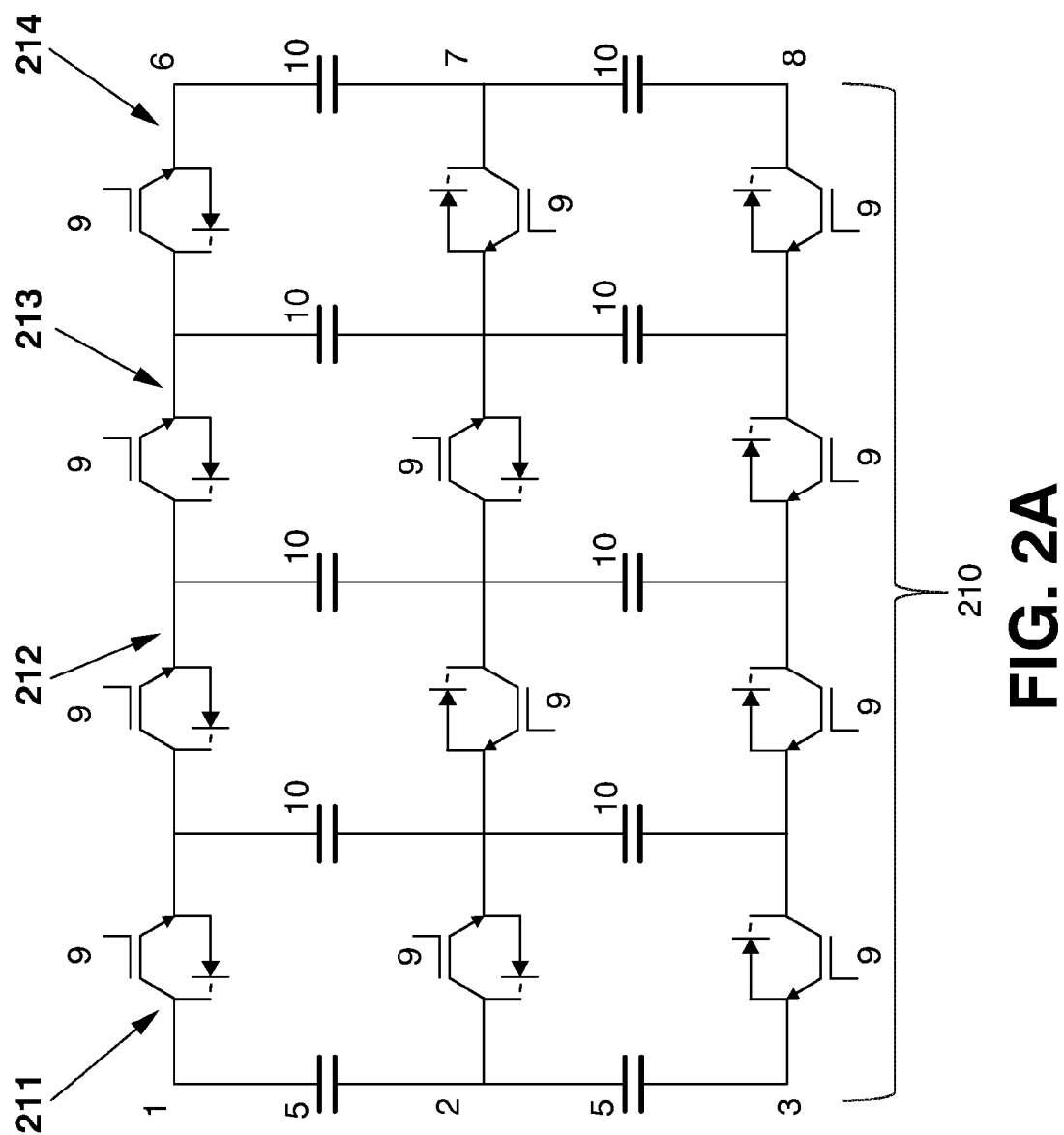
FIG. 2A shows a switching stage according to a possible embodiment of the invention for an example with 3 output voltage terminals and a capacitor connected between every two adjacent terminals in each cell of the stage.

FIG. 2A shows an example of a switching stage (210) with p=4 cells (211, 212, 213, 214) and for the case of having 2 bus capacitors (5) with m=2, i.e., m−1=1 intermediate DC voltage terminal (2), connecting one capacitor (10) between every two adjacent terminals of each cell.

Figure 2B:
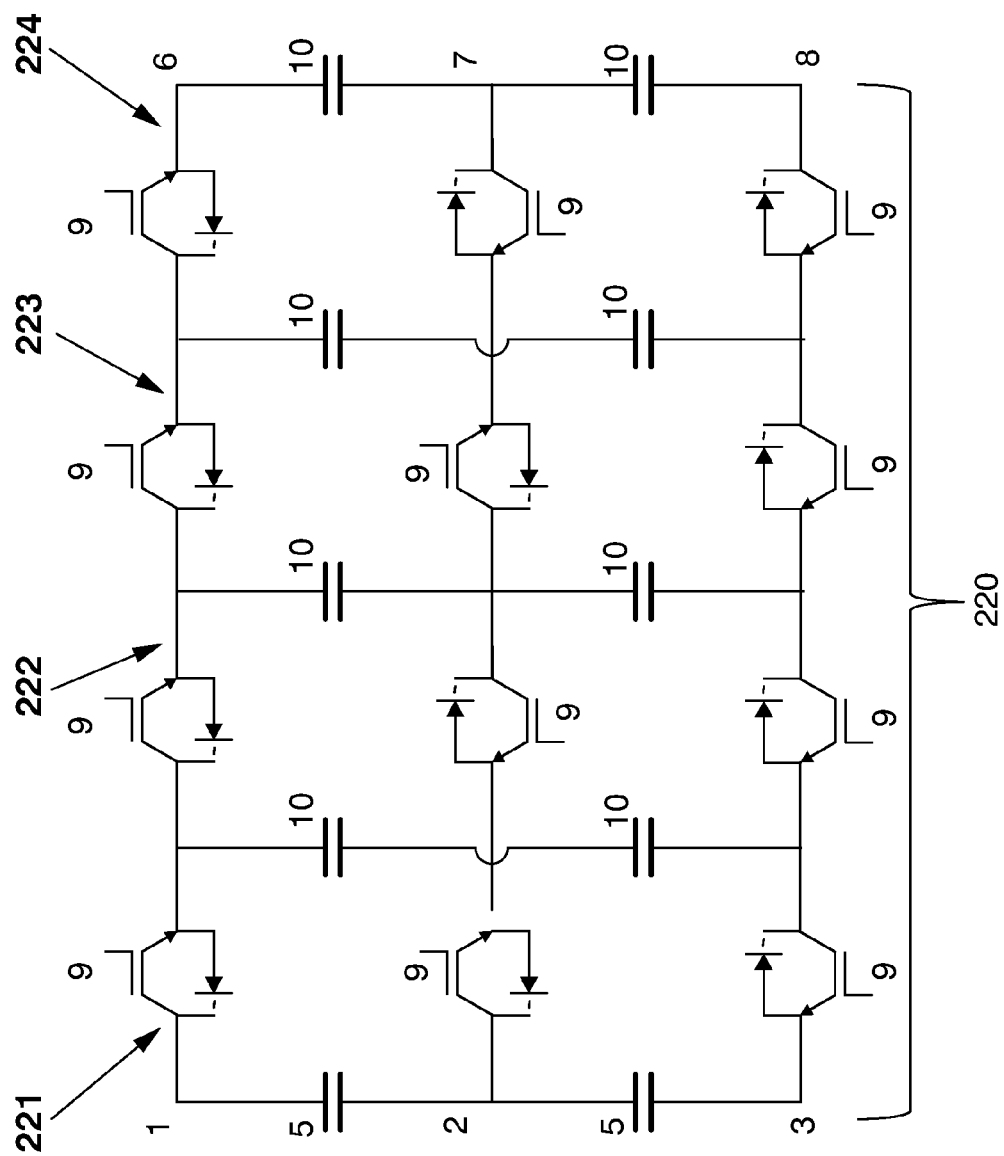
FIG. 2B shows a switching stage according to a possible embodiment of the invention for an example with 3 output voltage terminals with a capacitor between every two adjacent terminals in some of the cells and a single capacitor between the positive and negative terminals of some of the cells of the stage.

FIG. 2B shows an example also for the case of 2 bus capacitors (5) in a switching stage (220) having p=4 cells (221, 222, 223, 224) and connecting one capacitor (10) between every two adjacent terminals of some of the cells, but connecting only one capacitor (10) between the positive and negative terminals (6, 8) of some of the cells (222, 224).

Figure 2C:
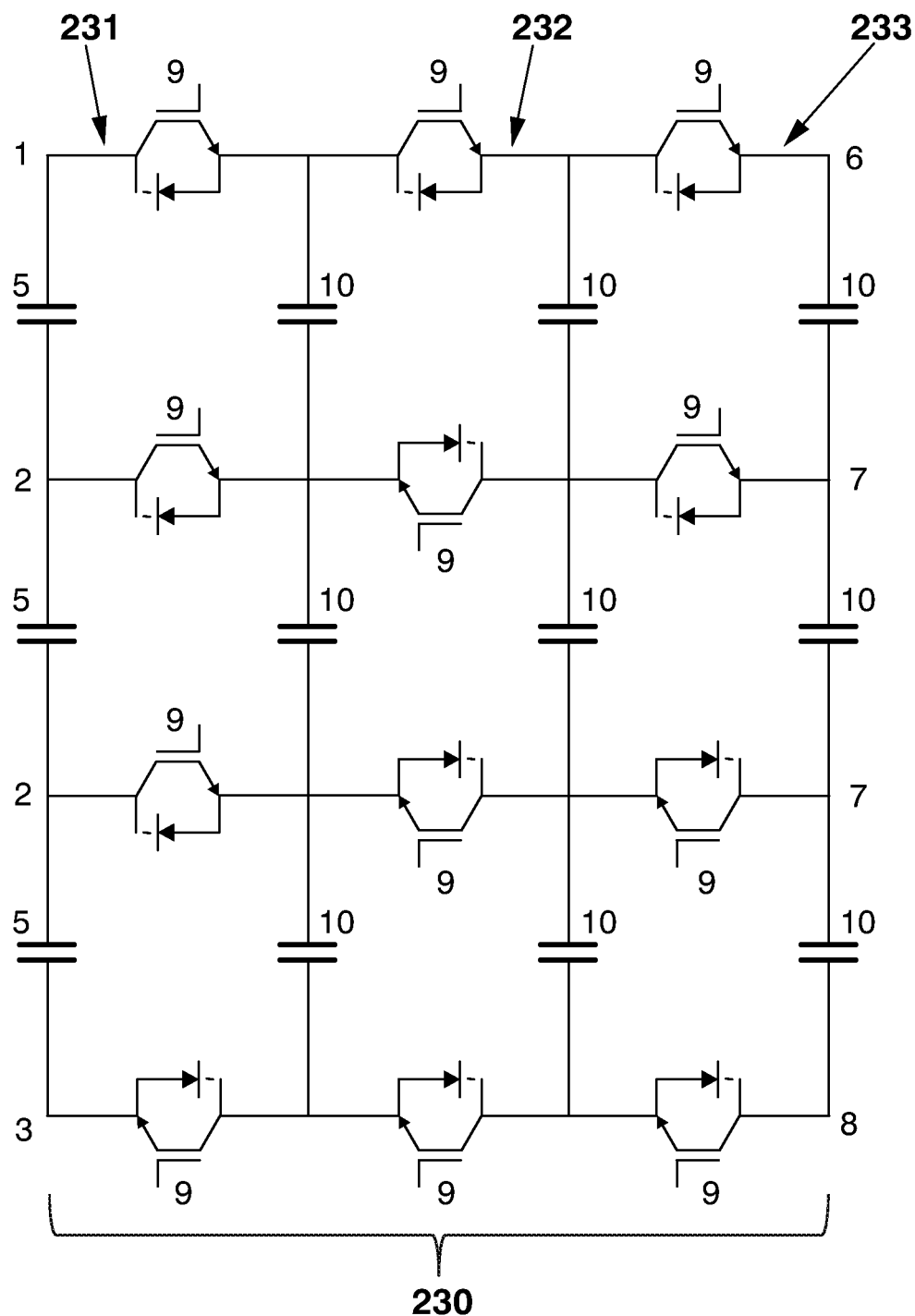
FIG. 2C shows a switching stage according to a possible embodiment of the invention for an example with 4 output voltage terminals and three cells.

FIG. 2C shows an example for the case of 3 bus capacitors (5) in a switching stage (230) having 3 cells (231, 232, 233), with m=3, i.e., m−1=2 intermediate DC voltage terminals (2), and connecting one capacitor (10) between every two adjacent terminals of each cell.

Figure 2D:
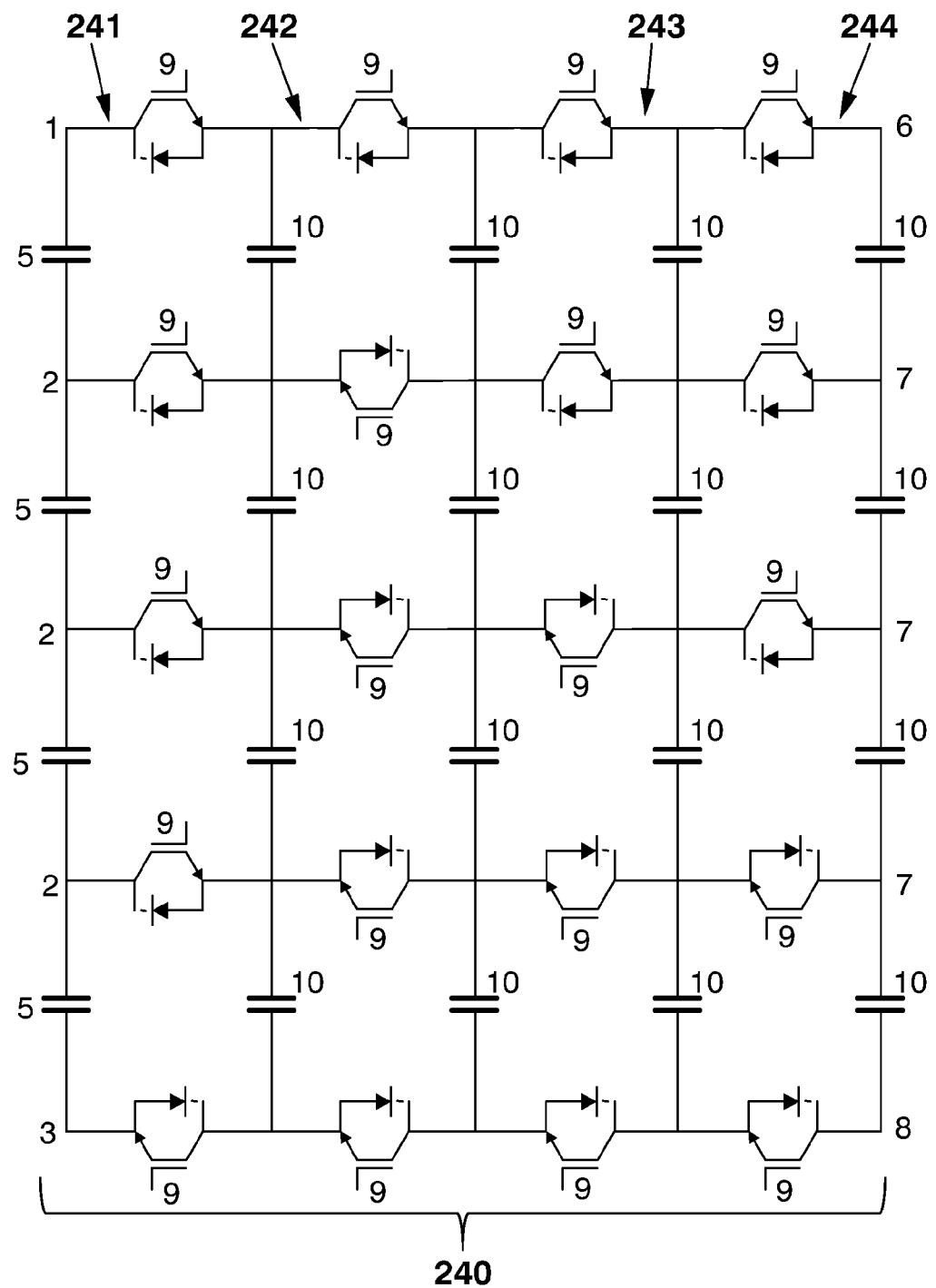
FIG. 2D shows a switching stage according to a possible embodiment of the invention for an example with 4 output voltage terminals and four cells.

FIG. 2D shows an example for the case of 4 bus capacitors (5) in a switching stage (240) having p=4 cells (241, 242, 243, 244) and m=4, i.e., m−1=3 intermediate DC voltage terminals (2), connecting one capacitor (10) between every two adjacent terminals of each cell.

Figure 3A:
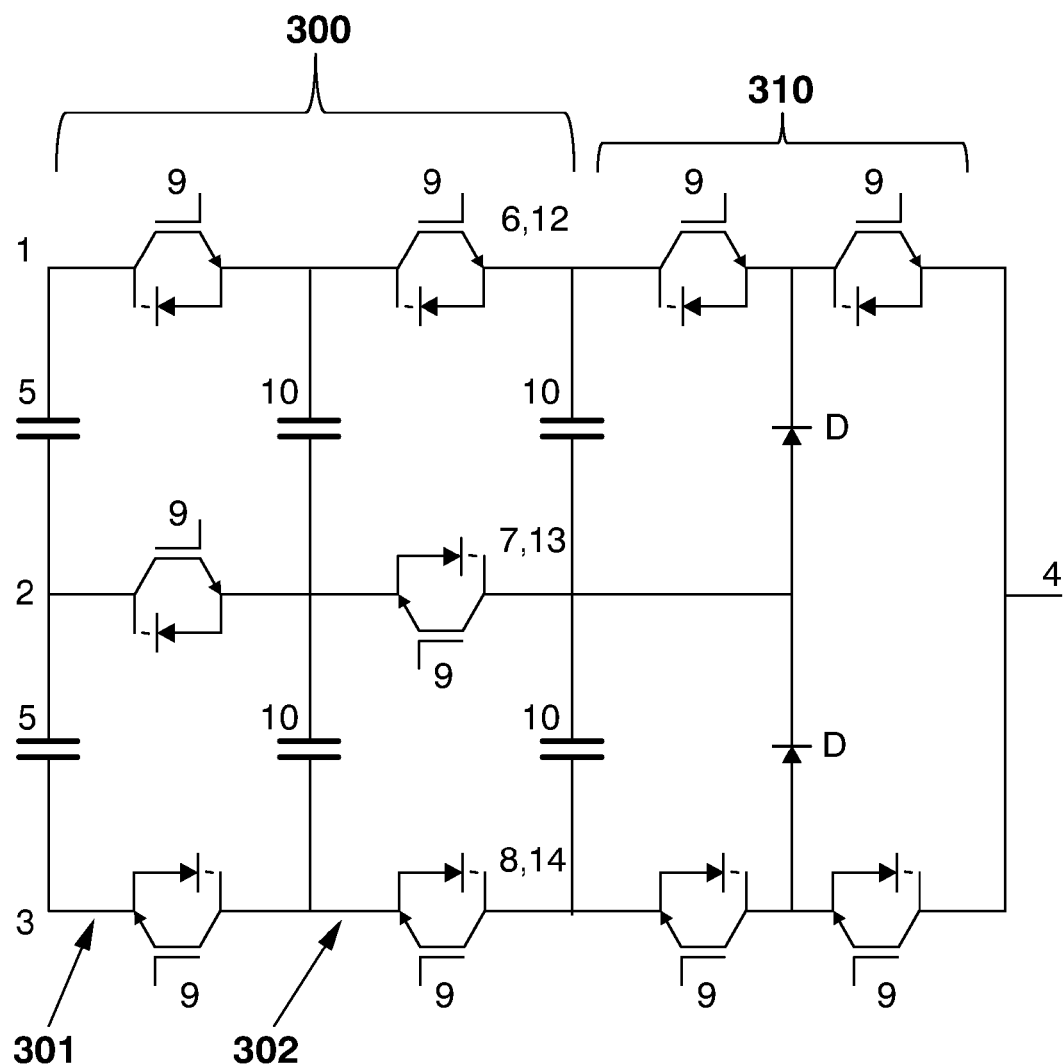
FIG. 3A shows a conversion circuit with a switching stage according to a possible embodiment of the invention for an example with 5 output voltage levels and two cells in the switching stage connected to an NPC converter with clamp diodes.
Figure 3B:
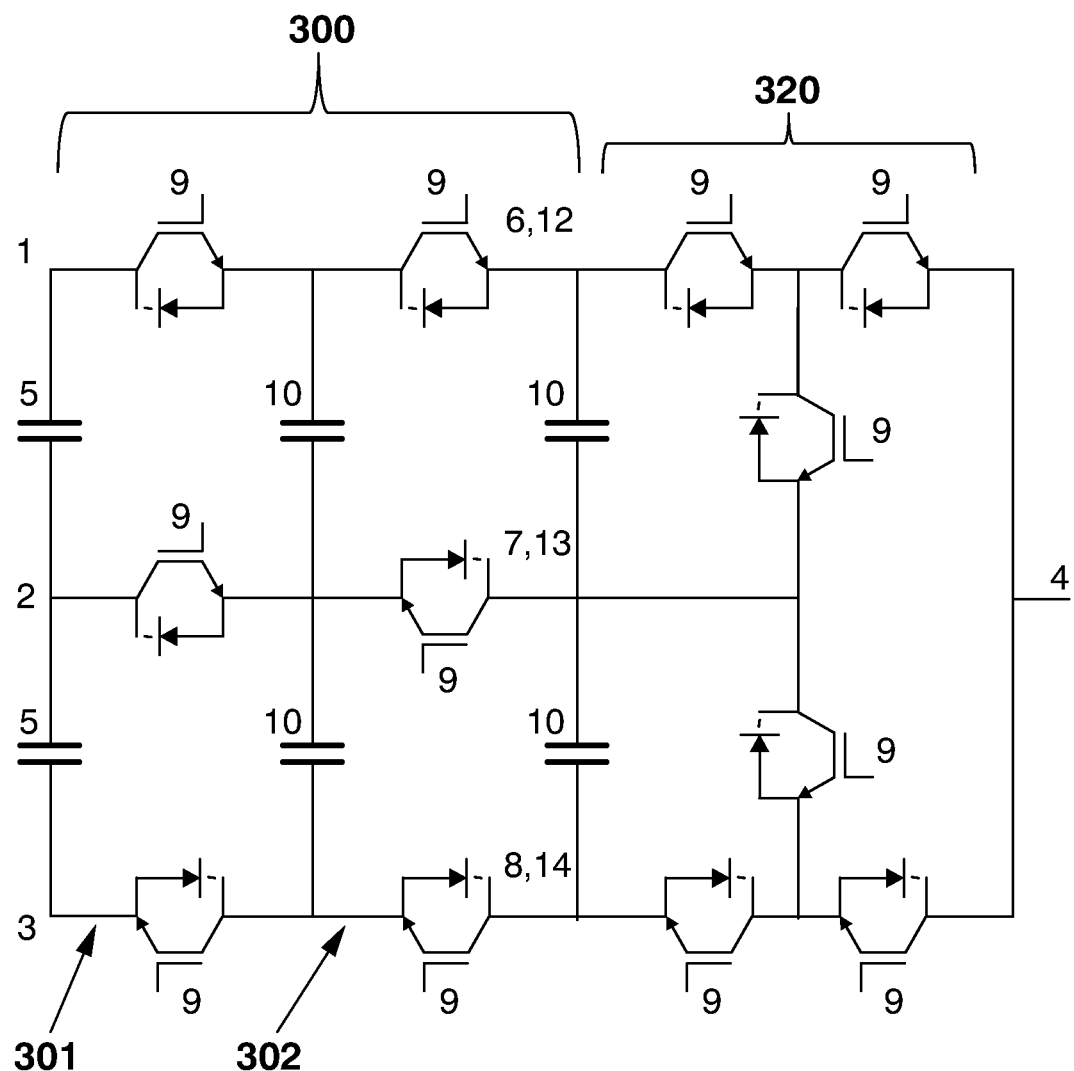
FIG. 3B shows a conversion circuit with a switching stage according to another possible embodiment of the invention for an example with 5 output voltage levels and two cells in the switching stage, replacing the clamp diodes with controlled semiconductors.
Figure 3C:
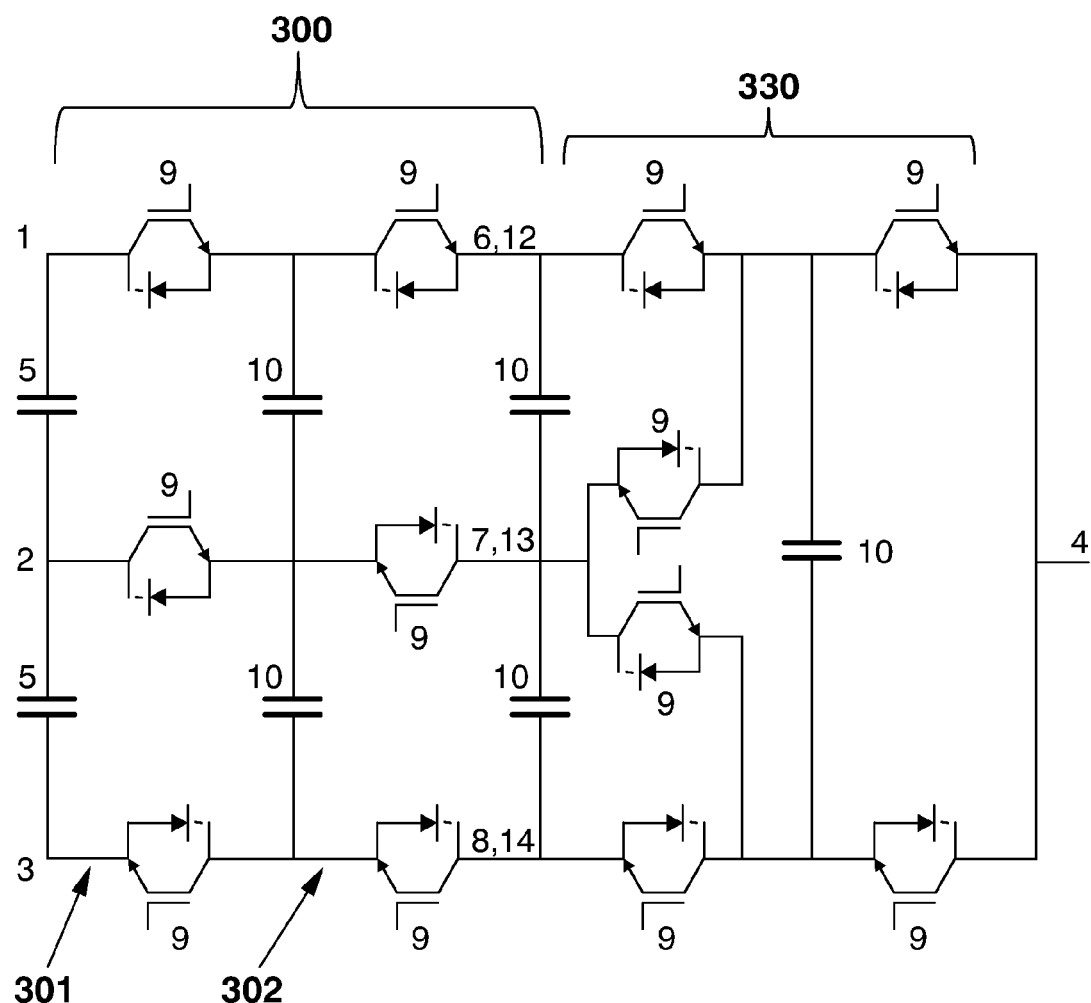
FIG. 3C shows a conversion circuit with a switching stage according to a possible embodiment of the invention for an example with 5 output voltage levels and two cells in the switching stage, with a Generalized Multilevel Inverter connected to the stage.

FIGS. 3A, 3B and 3C show three possible embodiments of the invention for the case of an energy conversion circuit with n=5 voltage levels, comprising a switching stage (300) having p=2 cells (301, 302) and a bus of capacitors made up of 2 capacitors (5) in the three examples. What distinguishes one embodiment of the invention from another in this case is the multilevel converter which is connected to the switching stage (300) of the energy conversion circuit. In FIG. 3A, a multilevel Neutral Point Clamped (NPC) converter (310) is connected to the switching stage (300); in FIG. 3B, a multilevel Active Neutral Point Clamped (ANPC) converter (320) is connected; and in FIG. 3C, the switching stage (300) is connected to a Generalized Multilevel Inverter converter (330) such as that described by F. Z. Peng in "Generalized Multilevel Inverter Topology with Self Voltage Balancing", IEEE Transactions on Industry Applications, 2001, mentioned in the prior state of the art. Generally, for this configuration case of the circuit with 5 voltage levels and two cells (301, 302) linked in the switching stage, the multilevel converter which can be connected to the switching stage (300) can be any converter having 3 terminals, i.e., its bus is made up of 2 capacitors.

Other possible embodiments of the energy conversion circuit which is described for the case m=2 comprises the proposed switching stage connected to a multilevel Transistor Clamped Converter (TCC) or to a multilevel Stacked Multi-Cell (SMC) converter.

Figure 4A:
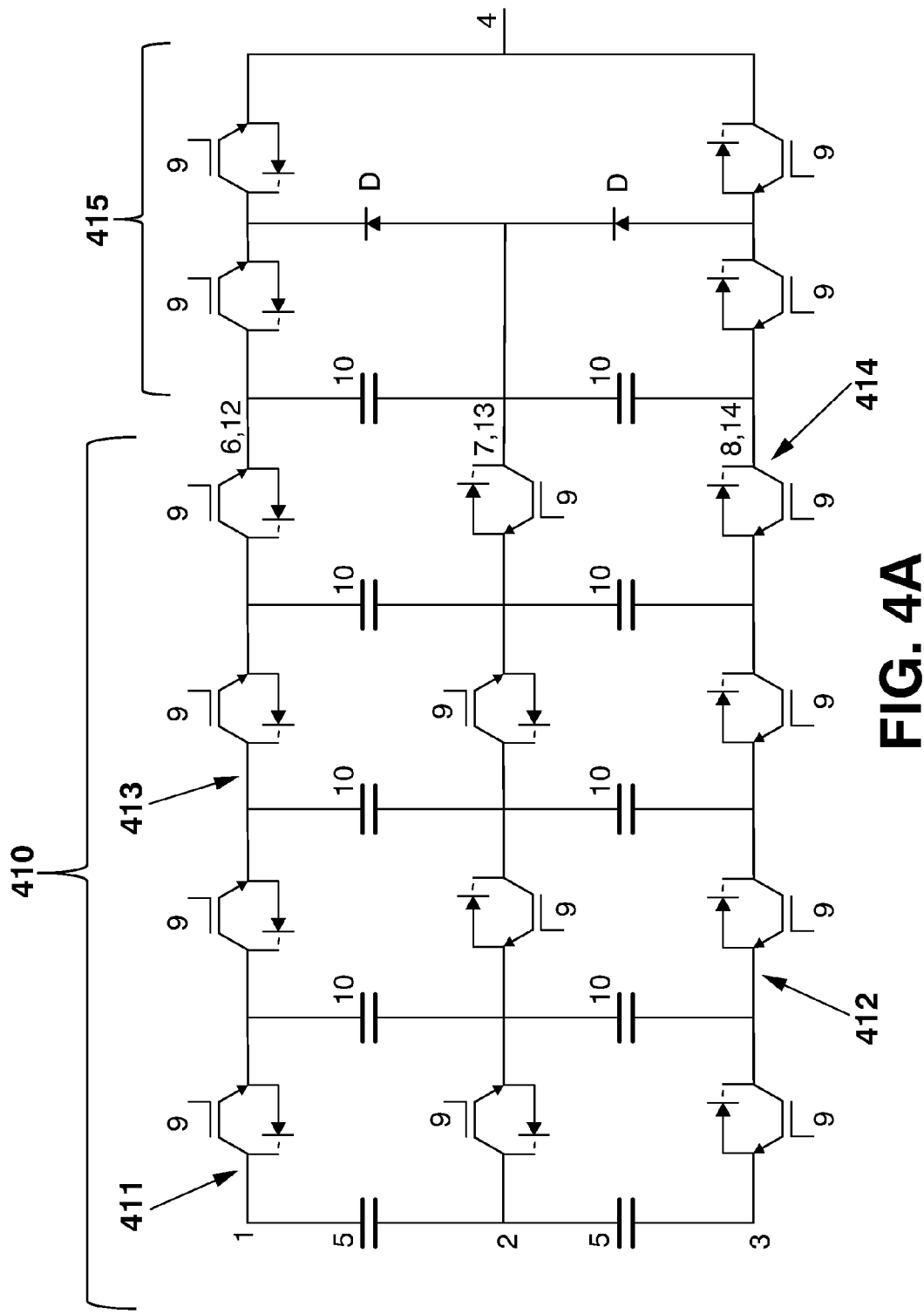
FIG. 4A shows a conversion circuit with a switching stage according to a possible embodiment of the invention for an example with 7 output voltage levels and four cells in the switching stage, connected to an NPC converter.
Figure 4B:
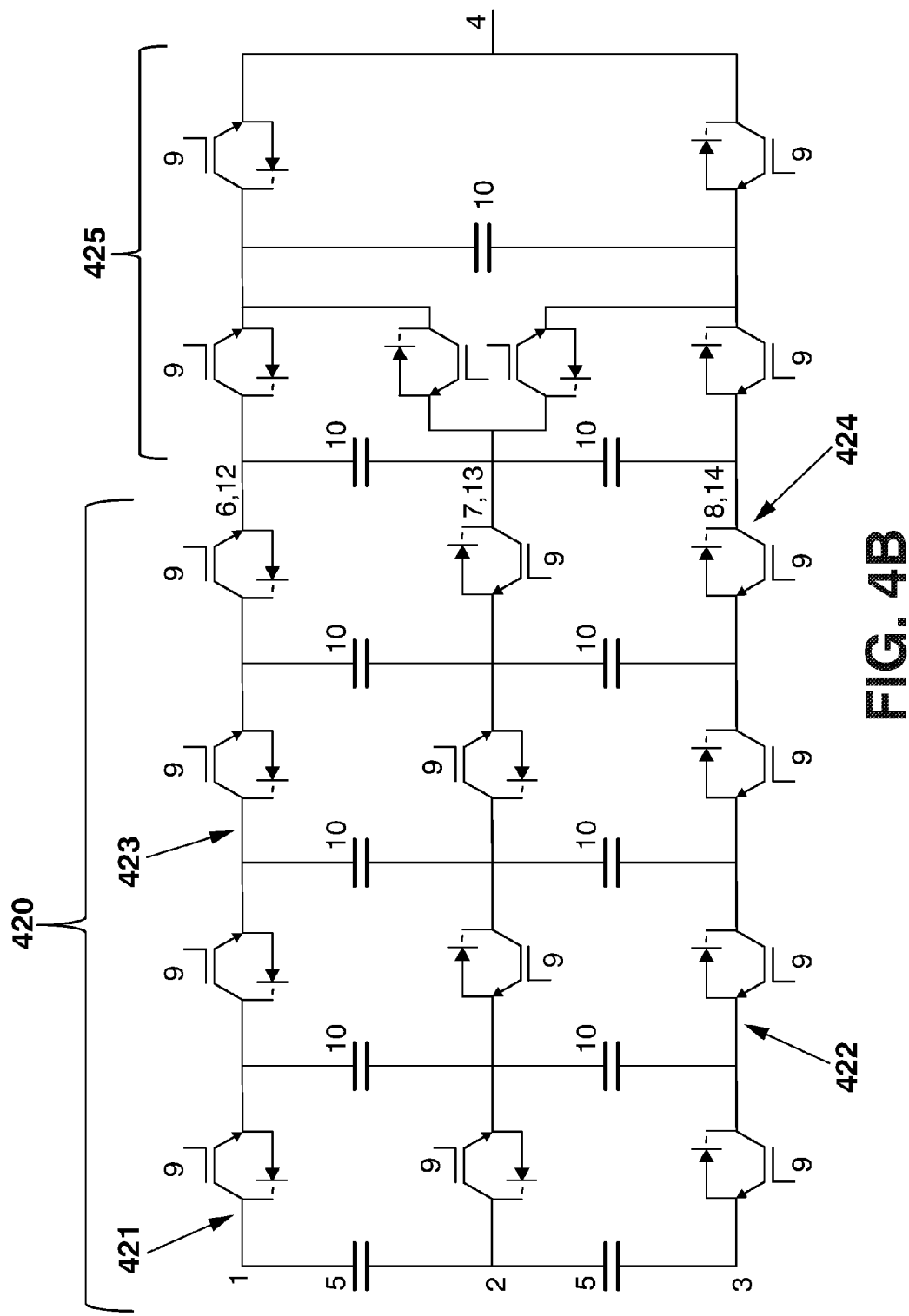
FIG. 4B shows a conversion circuit with a switching stage according to a possible embodiment of the invention for an example with 7 output voltage levels and four cells in the switching stage, connected to a Generalized Multilevel Inverter.
Figure 4C:
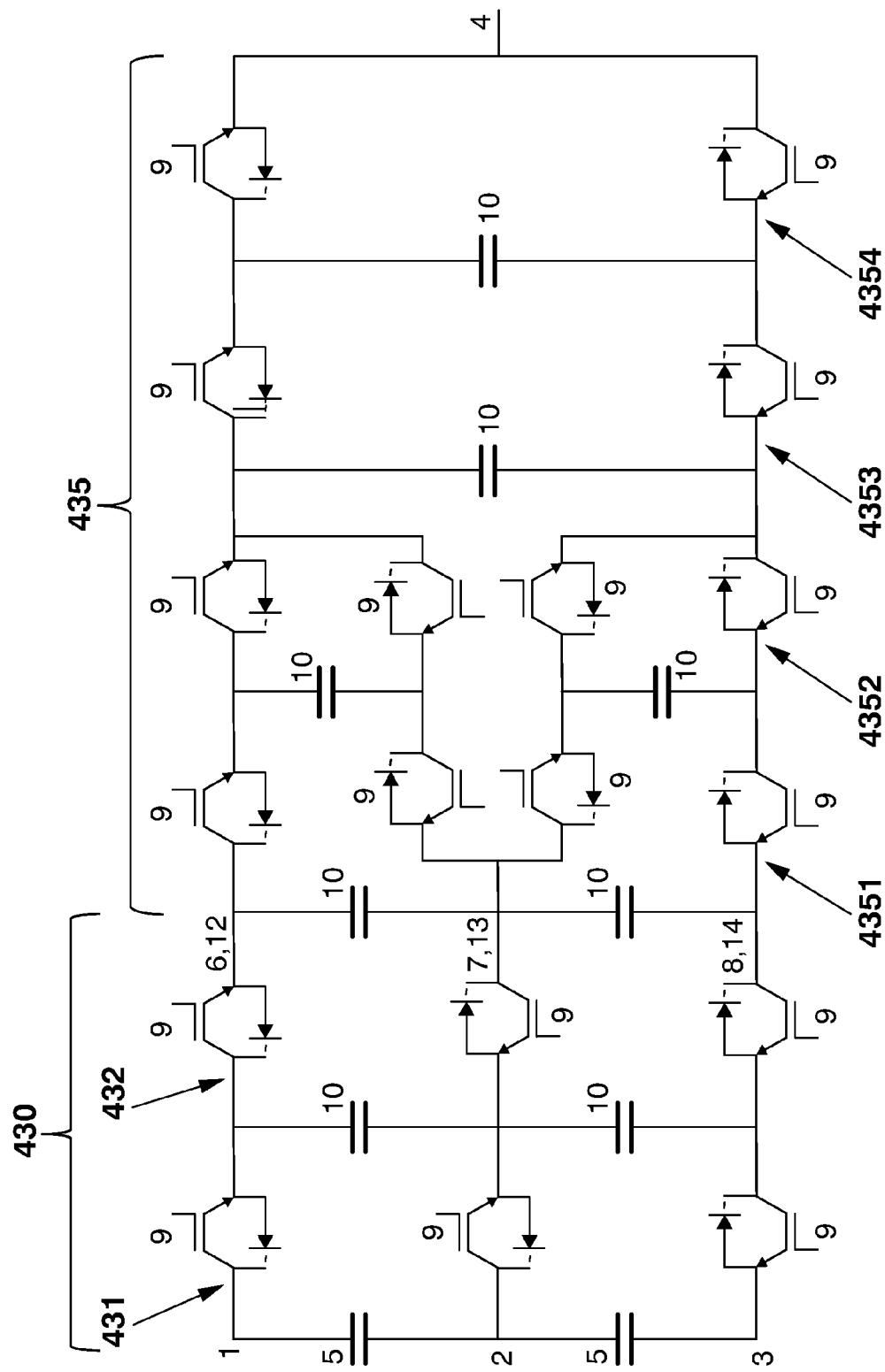
FIG. 4C shows a conversion circuit with a switching stage according to a possible embodiment of the invention for an example with 7 output voltage levels and two cells in the switching stage.

FIGS. 4A, 4B and 4C show three possible embodiments of the invention for the case of an energy conversion circuit with n=7 voltage levels, comprising a switching stage with a bus of capacitors made up of 2 capacitors (5) in the three examples. Two preferred configurations can be distinguished within this converter configuration with 7 levels and bus of 2 capacitors: in one configuration, the switching stage is made up of 4 cells and in the other configuration the switching stage is made up of 2 cells.

FIG. 4A shows an embodiment in which the switching stage (410) is made up of 4 cells (411, 412, 413, 414) and two DC bus capacitors (5), one connected between the positive DC voltage terminal (1) and an intermediate DC voltage terminal (2) and the other connected between the latter and the negative DC voltage terminal (3). The switching stage (410) is connected to a multilevel NPC converter (415), i.e., neutral point clamped converter, which has an AC voltage terminal (4) for connecting to the power generating machine, for example, a wind turbine.

FIG. 4B shows another embodiment of an energy conversion circuit with 7 voltage levels, where the switching stage (420) is also made up of 4 cells (421, 422, 423, 424) and two DC bus capacitors (5), but a Generalized Multilevel Inverter (425) such as that described by F. Z. Peng in the aforementioned background document of the prior state of the art is connected to said switching stage (420).

Another embodiment option can be connecting the switching stage (410, 420) having 4 cells to an ANPC converter, i.e., Active Neutral Point Clamped Converter.

Figure 5:
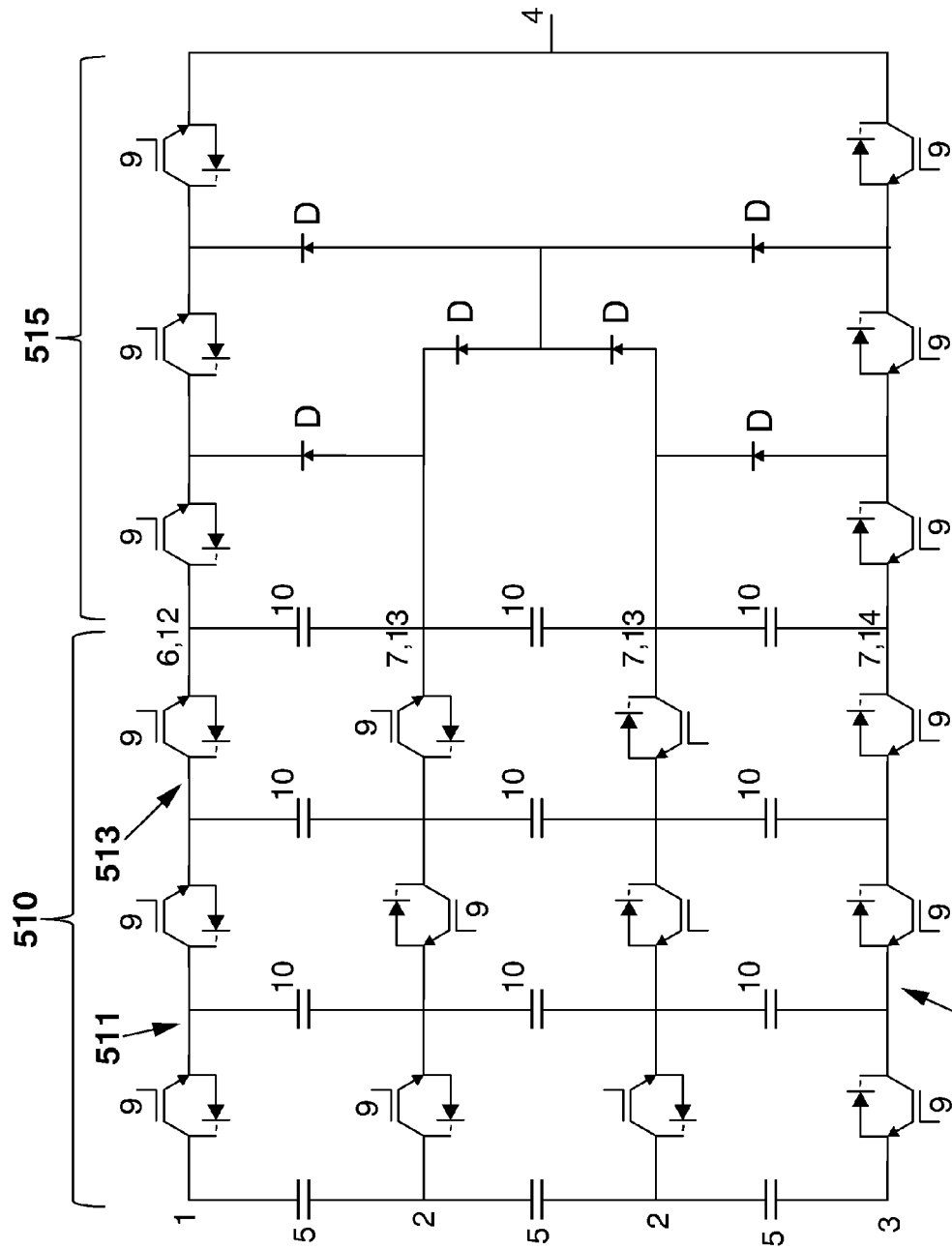
FIG. 5 shows a conversion circuit with a switching stage according to a possible embodiment of the invention for an example with 7 output voltage levels and three cells in the switching stage.

FIG. 4C shows an embodiment of an energy conversion circuit with 7 voltage levels and also a switching stage (430) with two DC bus capacitors (5) but where said switching stage (430) is made up of only 2 cells (431, 432) and connected to it there is a multilevel converter with multiple series-connected switching groups (435), which can be a 5L-ANPC converter having 5 active neutral point clamped levels such as that described according to the previously mentioned patent application EP1673849A1, which in the illustrated example comprises two first switching groups (4351, 4352) parallel-connected to one another and in turn parallel-connected to a second switching group (4353) and a third switching group (4354), each switching group made up of a first and a second controlled semiconductor (9) which are series-connected through a capacitor (10). In all cases, the positive output terminal (6) of the switching stage is connected to the positive voltage terminal (12) of the multilevel converter and the negative output terminal (8) of the switching stage is connected to the negative voltage terminal (14) of the multilevel converter. Furthermore, the switching stage has a single intermediate output terminal (7), i.e., m=2, connected to an intermediate voltage terminal of the multilevel converter (13), FIG. 5 shows a preferred embodiment of the invention of an energy conversion circuit also with 7 voltage levels for the case of a switching stage (510) consisting of 3 DC bus capacitors (5) and 3 cells (511, 512, 513), having two intermediate output terminals of the switching stage (7) which are connected respectively to respective intermediate voltage terminals of the converter (13), i.e., m=3. The multilevel converter which is connected to the switching stage (510) can be any converter having 4 terminals, i.e., its bus is made up of 3 capacitors, for example, a Neutral Point Clamped (NPC) converter, a Diode Clamped Converter (DCC), a Generalized Multilevel Inverter, etc. In the example of FIG. 5, the switching stage (510) is connected to a Diode (D) Clamped Converter (DCC) (515).

Figure 6A:
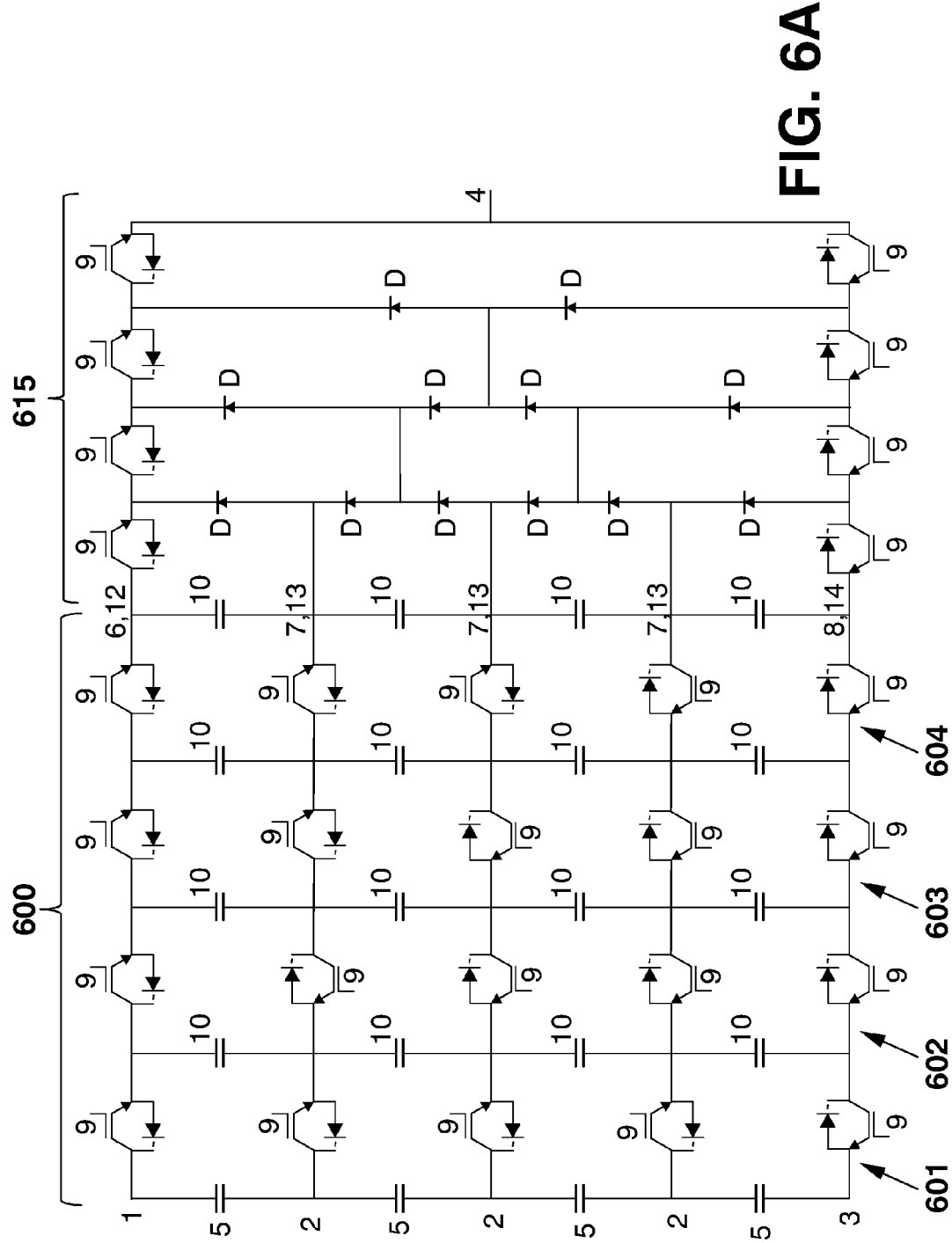
FIG. 6A shows a conversion circuit with a switching stage according to a possible embodiment of the invention for an example with 9 output voltage levels and four cells in the switching stage, with a DCC converter.
Figure 6B:
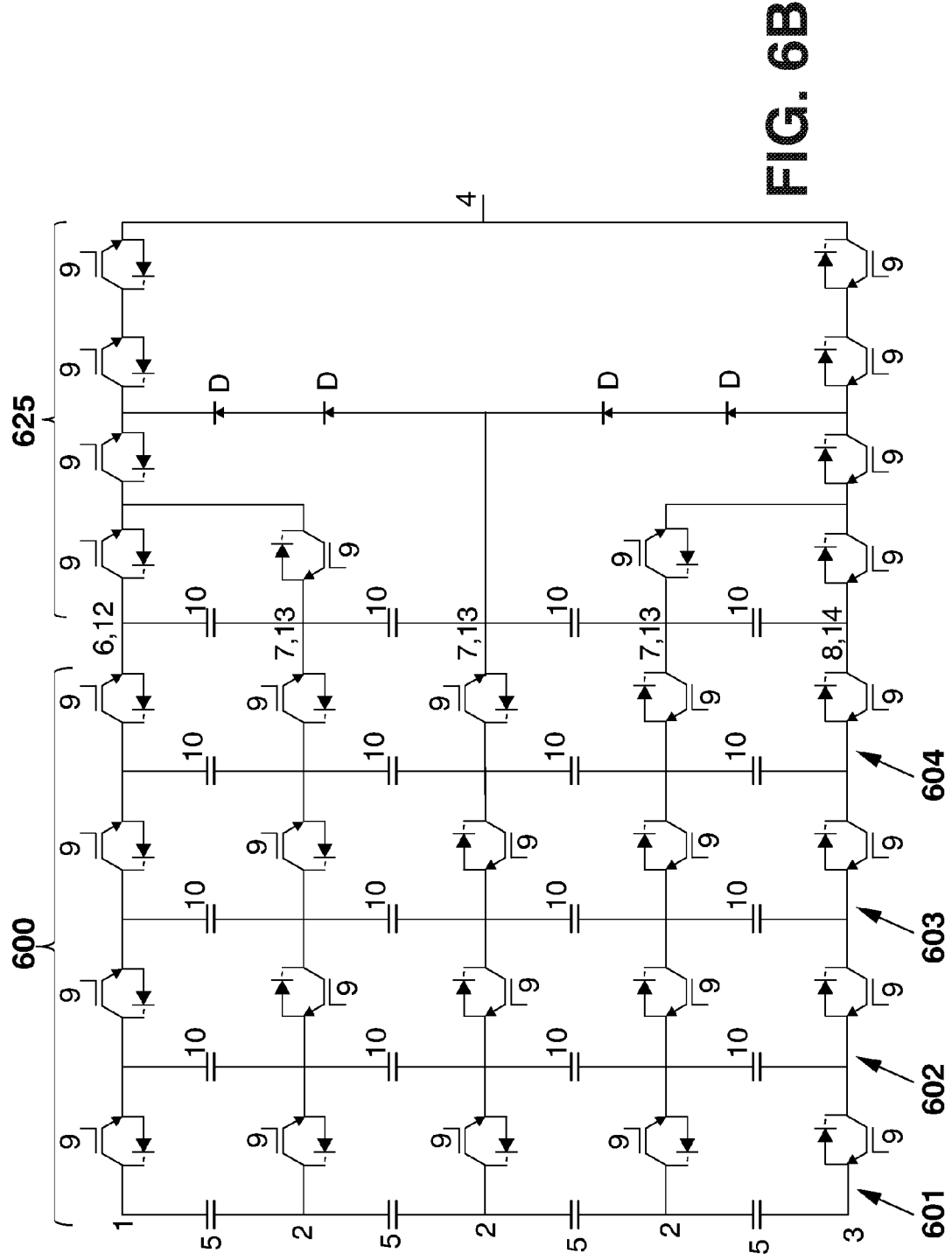
FIG. 6B shows a conversion circuit with a switching stage according to a possible embodiment of the invention for an example with 9 output voltage levels and four cells in the switching stage, with an MPC converter.

FIGS. 6A and 6B show two preferred embodiments of the invention for the case of an energy conversion circuit having n=9 voltage levels with a switching stage (600) consisting of 4 DC bus capacitors (5) and 4 cells (601, 602, 603, 604), having three intermediate output terminals of the switching stage (7) which are connected respectively to intermediate voltage terminals of the multilevel converter (13), i.e., m=4. The multilevel converter which is connected to the switching stage (600) can be any converter having 5 terminals, i.e., its bus is made up of 4 capacitors, for example, an NPC, a DCC, a Generalized Multilevel Inverter, a Multi Point Clamped (MPC) converter, etc. For example, in FIG. 6A, the switching stage (600) is connected to a multilevel DCC converter (615), whereas in FIG. 6B, the switching stage (600) is connected to a multilevel MPC converter (625).

Figure 7:
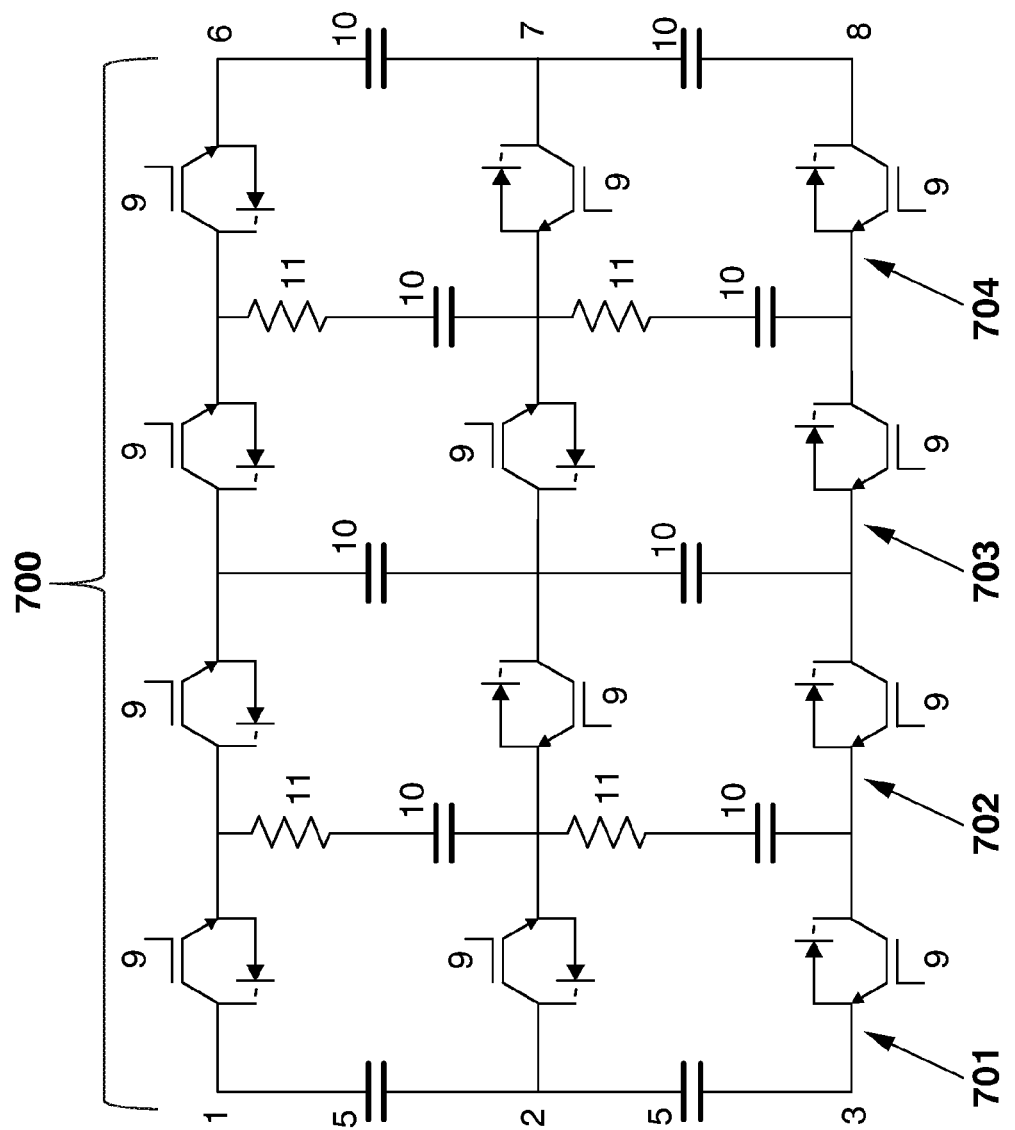
FIG. 7 a switching stage according to a possible embodiment of the invention for an example with four cells, two bus capacitors and some capacitors with a series-connected resistor.

FIG. 7 shows a preferred embodiment of the invention for the case of a switching stage (700) with p=4 cells (701, 702, 703, 704), and two DC bus capacitors (5), having a single intermediate output terminal (7), i.e., m=2, consisting of capacitors (10) series-connected to resistors (11) to limit voltage and current oscillations in the semiconductors (9) during switching.

Note that in this text the term "comprises" and its derivatives (such as "comprising", etc.) must not be understood in an excluding sense, i.e., these terms must not be interpreted so as to exclude the possibility that what is described and defined above can include additional elements, stages, etc.

The invention claimed is:

1. A switching stage (210, 220, 230, 240, 300, 410, 420, 430, 510, 600, 700) for multilevel power converters, including both DC to AC converters and AC to DC converters, which can be applied in energy conversion systems, comprising:

a DC bus of capacitors with a plurality of m, m>1, DC bus capacitors (5);

a positive DC voltage terminal (1) a negative DC voltage terminal (3) and m−1 intermediate DC voltage terminals (2), having a total of m+1 DC voltage terminals which can be numbered from 1 to m+1, from the positive DC voltage terminal (1) to the negative DC voltage terminal (3);

and having the m DC bus capacitors (5) interconnected between the positive DC voltage terminal (1) and the negative DC voltage terminal (3), and the m−1 intermediate DC voltage terminals (2);

the switching stage comprising:

a positive output terminal of the switching stage (6), a negative output terminal of the switching stage (8) and m−1 intermediate output terminals (7), having a total of m+1 output terminals;

a number p, p>=1, of linked cells, each cell comprising: m+1 input terminals and m+1 output terminals of the cell;

at least one capacitor (10), each capacitor (10) being connected to any two of the m+1 output terminals of the cell;

m+1 switches (9), which can be numbered from i=1 to i=m+1, switch (9) number i being connected between input terminal number i of the cell and output terminal number i of the cell and, for i=1 to i=m+1, output terminal number i of the switching stage being connected to output terminal number i of each cell and number p DC voltage terminal number i of the switching stage being connected to input terminal number i of the cell number 1;

and if p>1, for j=1 to j=p−1, cell number j is linked to adjacent cell number j+1 such that for i=1 to i=m+1, output terminal number i of the cell number j is connected to input terminal number i of adjacent cell number j+1.

2. Switching stage according to claim 1, wherein at least one cell has a single capacitor (10) connected between output terminals number 1 and number m+1 of the cell.

3. Switching stage according to claim 1, wherein at least one cell has a plurality of m−1 capacitors (10), numbered from i=1 to i=m−1 and capacitor number i being connected between output terminals number i and number i+1 of the cell.

4. Switching stage according to claim 1, wherein at least one capacitor (10) has a series-connected resistor (11).

5. Switching stage according to claim 1, wherein in one cell at least two terminals of the cell are connected to one another.

6. Switching stage according to claim 1, wherein the switches (9) are two-way with respect to current and one-way with respect to voltage.

7. Switching stage according to claim 1, wherein the switches (9) are selected from IGBT transistors, IGCT thyristors, IEGT transistors, GTO thyristors and combinations thereof, all with an anti-parallel connected diode.

8. Energy conversion circuit for multiple output voltage levels, comprising a multilevel converter (310, 320, 330, 415, 425, 435, 515, 615, 625) which is selected from a DC to AC converter and AC to DC converter, the multilevel converter comprising an AC voltage terminal (4), a positive voltage terminal of the multilevel converter (12), m−1 intermediate voltage terminals of the multilevel converter (13) and a negative voltage terminal of the multilevel converter (14), with a total of m+1 terminals numbered from 1 to m+1 from the positive voltage terminal (12) to the negative voltage terminal (14), and a switching stage (210, 220, 230, 240, 300, 410, 420, 430, 510, 600, 700) defined according to claim 1 which is connected to the multilevel converter such that for i=1 to i=m+1, voltage terminal number i of the multilevel converter is connected to output terminal number i of the switching stage.

9. Energy conversion circuit according to claim 8, wherein the number m of DC bus capacitors (5) is selected from m=4, m=3 and m=2.

10. Energy conversion circuit according to claim 9, wherein the number m of DC bus capacitors (5) is m=2 and the multilevel converter is selected from a multilevel NPC converter (310, 415), a Generalized Multilevel Inverter (330, 425), a multilevel ANPC converter (320), a multilevel DCC converter, a multilevel TCC converter, a multilevel ANPC converter having 5 levels and a multilevel SMC converter.

11. Energy conversion circuit according to claim 8, wherein the number m of DC bus capacitors (5) is m≥3 and the multilevel converter is of m+1 levels which is selected from a multilevel NPC converter, a Generalized Multilevel Inverter, a multilevel DCC converter (515,615) and a multilevel MPC converter (625).

12. Energy conversion circuit according to claim 8, wherein it further comprises pulse width modulation control means to synthesize an alternating voltage in the AC voltage terminal (4) of the multilevel converter.

13. Energy conversion circuit according to claim 8, wherein it further comprises voltage stabilizing means which use redundancies to keep the voltage of at least one capacitor (10) stable and said voltage stabilizing means introduce a homopolar voltage to keep the voltage of the intermediate DC voltage terminals (2) balanced.

14. Conversion stage for a wind turbine, wherein it comprises an energy conversion circuit such as that defined in claim 8.

* * * * *